United States Patent [19]
Dittmann

[11] Patent Number: 5,419,698
[45] Date of Patent: May 30, 1995

[54] DEVICE FOR HEAT TREATMENT OF BULK MATERIALS

[75] Inventor: Guenter Dittmann, Dessau, Germany

[73] Assignee: Kloeckner-Humboldt-Deutz Aktiengesellschaft, Cologne, Germany

[21] Appl. No.: 958,110

[22] PCT Filed: Apr. 29, 1992

[86] PCT No.: PCT/DE92/00344
  § 371 Date: Apr. 23, 1993
  § 102(e) Date: Apr. 23, 1993

[87] PCT Pub. No.: WO92/19560
  PCT Pub. Date: Nov. 12, 1992

[30] Foreign Application Priority Data

Apr. 29, 1991 [DE] Germany ................ 41 14 042.7

[51] Int. Cl.⁶ .................................................. F27D 15/02
[52] U.S. Cl. ........................................... 432/77; 432/78
[58] Field of Search ........................... 432/77, 78, 80

[56] References Cited

U.S. PATENT DOCUMENTS

| | | | |
|---|---|---|---|
| 4,624,636 | 11/1986 | Willis | 432/78 |
| 4,732,561 | 3/1988 | Eiring et al. | 432/78 |
| 4,762,489 | 8/1988 | Schmits et al. | 432/78 |
| 5,129,820 | 7/1992 | Kupper et al. | 432/77 |
| 5,149,266 | 9/1992 | Heinemann et al. | 432/77 |
| 5,201,652 | 4/1993 | Kawamura et al. | 432/78 |

FOREIGN PATENT DOCUMENTS 0219745 10/1986 European Pat. Off.
0245630  3/1987 European Pat. Off.

*Primary Examiner*—Henry C. Yuen
*Attorney, Agent, or Firm*—Hill, Steadman & Simpson

[57] ABSTRACT

A mechanism for the cooling of bulk materials such as hot cement clinker emerging from a calcining furnace with a materials transfer device for receiving hot discharge from a furnace into the cooling mechanism with the cooling mechanism having a first cooling section with an immobile stepped grate inclined relative to the horizontal whereby material passes from a receiving end to a discharge end, also having a second cooling section positioned so that the material to be cooled is discharged from the first cooling section onto a receiving end of the second cooling section which includes a sliding grate, and a third cooling section having an immobile inclined stepped grate positioned to receive material from the discharge end of the second cooling section and passing the material over the third cooling section to a discharge end.

10 Claims, 1 Drawing Sheet

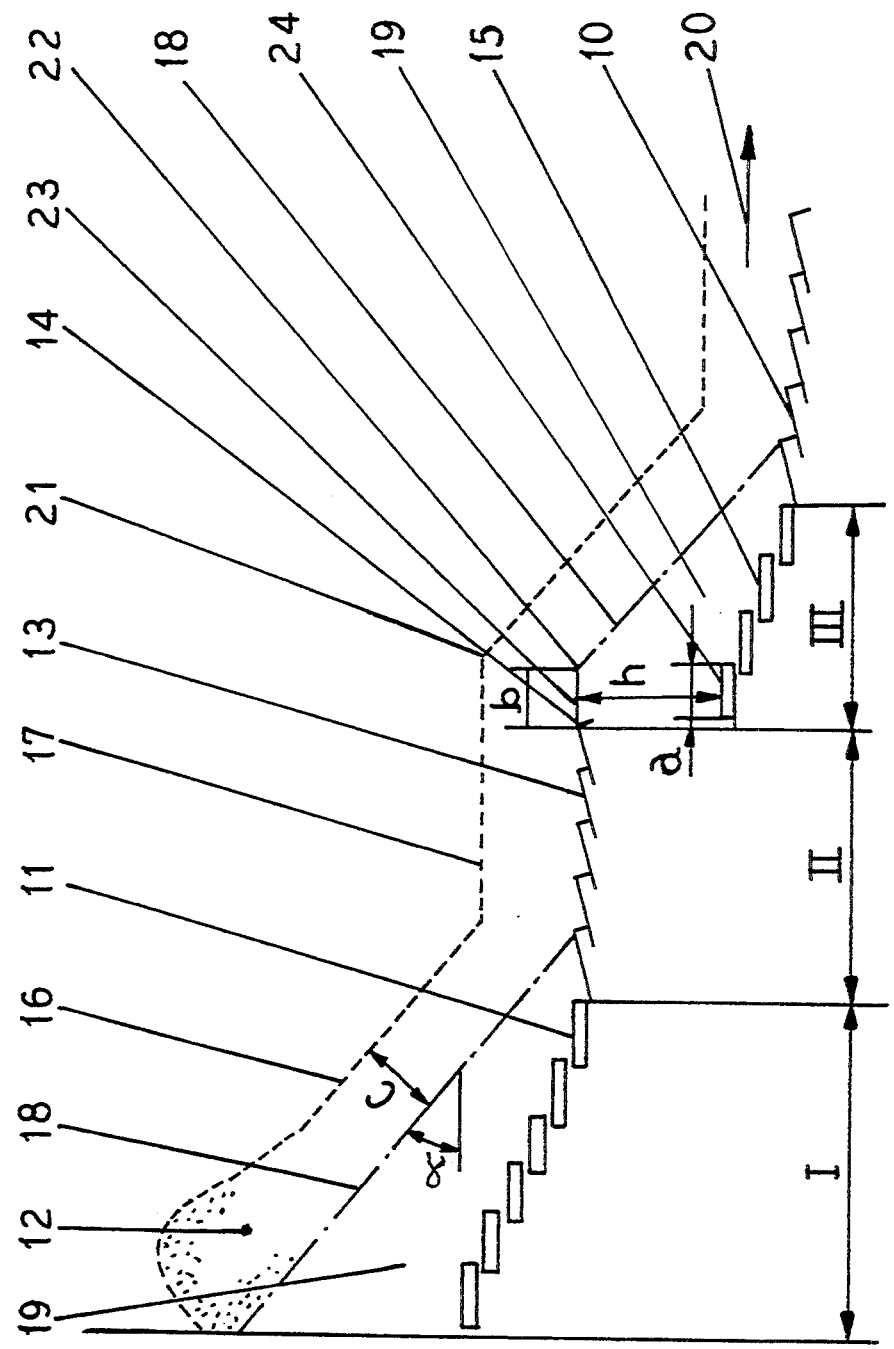

DEVICE FOR HEAT TREATMENT OF BULK MATERIALS

BACKGROUND OF THE INVENTION

The invention is directed to a device for the thermal treatment of bulk materials, particularly for cooling hot cement clinker emerging from a calcining furnace, comprising a materials transfer means arranged in the region under the furnace discharge that can be charged with cooling gas and comprises a stepped grate inclined relative to the horizontal, this materials transfer means being followed by a grate such as, for example, a sliding grate that carries and conveys the material to be cooled.

Devices of this species are employed in the nonmetallic minerals industry in order to highly cool the material (for example, cement clinker or other mineral materials) previously calcined in a calcining furnace immediately thereafter in the desired way. The red-hot material coming from the furnace discharge should experience an initial, great cooling in a materials transfer means that can be charged with cooling gas and leads to the actual cooler, usually a sliding grate cooler, traveling grate cooler or the like, and should thereby be conveyed with optimally good distribution to the following cooler on which the main cooling work is then performed while the material to be cooled continues to be conveyed in longitudinal direction. At least the cooling air blown through the hot material in the materials transfer means should generally be reemployed or, respectively, employed in some other way in the preceding furnace system as heated combustion air (secondary air, tertiary air).

In a known cooling means for cooling hot cement clinker (periodical "Zement-Kalk-Gips", No 2/95, pages 87–90), the materials transfer means preceding a conventional sliding grate cooler is composed of a single stepped grate chargeable with pulsating cooling air whose angle of inclination is smaller than the natural angle of slope of the hot cement clinker emerging from the calcining furnace, so that a layer of material remains lying on the stepped grate on whose surface the fresh product material to be cooled should slide in the direction to the conventional grate cooler. The fresh cement clinker bed should thereby also slide on the single slope of the materials transfer means when the bed is advanced on the following sliding grate cooler. However, one does not efficiently succeed in distributing the fresh clinker bed transversely relative to the main conveying direction as well with the known materials transfer means; this would be necessary for a good heat transfer between the hot cement clinker and the cooling air. When the sole stepped grate of the known materials transfer means is fashioned extremely long, the risk is not precluded that the fresh clinker bed can no longer maintain itself on the stepped grate, which would result in too low a clinker bed height, too short a dwell time of the cooling air in the clinker bed and the inadequate cooling thereof. Insofar as the surface of the hot, fresh clinker bed were to crust due to inadequate cooling on a zone-by-zone basis, whereby incrustations at the surface of the bulk material would impede the passage of the cooling air, then the known cooling means would make no provision therefor that such incrustations are in turn destroyed immediately after they arise insofar as possible.

An object of the invention is to create a device of the species initially cited having an improved materials transfer means that, given low technical outlay, enables an efficient distribution of material transversely relative to the conveying direction as well, enables a reliable break-up of incrustations of material potentially forming on the bed of bulk material and offers further advantages and that, finally, makes an increased heat recovery or, respectively, heat recuperation from the clinker heat back into the furnace system and, thus, a further reduction in the specific heat requirement of an overall cement clinker production line possible.

FEATURES OF THE INVENTION

In the device of the invention, the materials transfer means is composed of three longitudinal sections between furnace discharge and the actual cooler, for instance sliding grate cooler, traveling-bar cooler, pipe cooler or the like, the first of said three longitudinal sections comprising an immobile, inclined stepped grate, the middle section thereof comprising a sliding grate and the third section thereof again comprising an immobile, inclined stepped grate, whereby all three sections are charged from below with cooling gas (usually, cooling air). The sliding grate of the materials transfer means situated in the middle section is fashioned comparatively short and comprises up to five rows of grate plates whereof at least one middle row of grate plates but not more than three rows are movably arranged. The plane of this comparatively short sliding grate of the middle section of the materials transfer means lies horizontally or is only slightly inclined in conveying direction. I.e., the sliding grate of the middle section only lends the bulk material situated thereon a comparatively low conveying speed, as a result whereof the height of the product bed can be kept comparatively great, this resulting in a long dwell time of the cooling gas in the product bed which, consequently, can cool well as a result of the cooling gas.

Whereas the stationary, inclined stepped grate of the first section of the materials transfer means of the device of the invention comprises approximately five through six steps or, respectively, rows of grate plates, the other inclined, stationary stepped grate of the third section comprises only up to four steps or, respectively, rows of grate plates. Due to a high shoulder or, respectively, due to a high step, the start of the stepped grate of this third section lies lower than the end of the short sliding grate of the middle section. A normal cooler, particularly a sliding grate cooler then follows the inclined stepped grate of the third section of the materials transfer means. The short sliding grate of the middle section can be expediently connected to the sliding drive unit of the normal sliding grate cooler following upon the third section.

The advantage of the device of the invention is essentially comprised therein that, due to the arrangement of two immobile, inclined stepped grates separated from one another and separated by the comparatively short sliding grate of the middle section, high bed heights and a good transverse distribution of the bulk material are enabled in order to improve the heat transfer between the hot bulk material and the cooling air since a more reliable bank-up of the bulk material is achieved via the two relatively short scarp distances separated from one another in combination with the intervening, short sliding grate. Given, by contrast, a continuous stepped grate (for example, shown and described in the aforementioned trade journal "Zement-Kalk-Gips") having an overall length of the two stepped grates that are separated in the subject matter of the invention, the desired, high bed height of the fresh, hot feed could not be achieved, since the necessary banking effect for the fresh material is lost over the long slope distance; this would lead to short dwell times of the cooling air in the product bed as well as to a deteriorated heat transfer. In a single, long, continuous, inclined stepped grate in the materials transfer means, moreover, spherical accretions or, respectively, sintered chunks would roll down to the end of the slope. In the device of the invention, by contrast, these sintered chunks are decelerated in the middle section of the materials transfer means on the practically planar surface of the bulk material over the short sliding grate of this middle section and are slowly conveyed forward from this point.

In the device of the invention, the two immobile, inclined stepped grates separated from one another in the materials transfer means are protected against thermal and abrasive wear to the farthest-reaching extent because the angle of inclination of these two stepped grates is smaller than the natural slope angle of the bulk material, so that the bulk material remains lying on the two stepped grates in its cooled condition below a defined parting line (shearing section) and acts as an autonomous anti-wear protection for the fresh bulk product material sliding down thereover. Noteworthy wear of the grate plates should therefore only be anticipated in the short sliding grate of the middle section of the materials transfer means. In comparison to the grate plates of the immobile, inclined stepped grates, the grate plates contained therein are fashioned significantly simpler and they can also be more easily replaced, both having a cost-reducing effect.

The improvement in the distribution of the bulk material transversely relative to the conveying direction is essentially achieved with the two-fold bank-up effect of the two inclined stepped grates separated from one another by avoiding too fast a flow-down of the banked, upper, fresh layer of bulk material in the main conveying direction, i.e. the two immobile, inclined, stepped grates separated from one another and not having particularly great length or, respectively, the product layers respectively remaining lying thereon are in the position to stabilize the upper layers of the bulk material.

The highest temperature of the fresh layer of bulk material, for example red-hot cement clinker, will occur at the surface thereof. The particles of material can frit or, respectively, adhere or, respectively, encrust thereat. Surface incrustations, however, would impede the passage of cooling air and, thus, the cooling of the bulk material. Possible incrustations on the surface of the bulk material are inventively broken up at a sharp transition from the short sliding grate of the middle section to the inclined stepped grate of the third longitudinal section in the device of the invention, forced by a high shoulder or, respectively, a high step between the end of the short sliding grate of the middle section and the beginning of the stepped grate of the third section of the materials transfer means; as a result thereof, the necessary air permeability is restored in the product layer to be cooled.

The invention and further features and advantages thereof shall be set forth in greater detail with reference to the exemplary embodiment schematically shown in the drawing.

DESCRIPTION OF THE DRAWINGS

FIG. 1, the single FIGURE of the drawings is a schematic elevational view of a cooling mechanism embodying the features of the present invention.

DESCRIPTION OF THE PREFERRED EMBODIMENT

The drawing schematically shows a longitudinal section through the device of the invention with reference to the example of cooling red-hot cement clinker discharged from a rotary tubular kiln. A materials transfer means chargeable with cooling air from below is arranged in the region below the kiln discharge, this materials transfer means being joined by a sliding grate cooler 10 of a standard type that carriers and conveys the material to be cooled. The materials transfer means is subdivided into three longitudinal sections (I, II, III) that are equipped with different grates. An immobile, inclined stepped grate 11 is arranged in the first section I, having an angle of inclination of, for example, 20° that is smaller than the natural slope angle ($\alpha$) of the fresh bulk material 12 (hot cement clinker) of, for example, 35°. The stepped grate 11 of the first section I is followed in the second section II by a short sliding grate 13 at whose end 14 a further immobile, inclined step grate 15 of section III follows via a high, downwardly leading step having the height h, the normal sliding grate cooler 10, finally, then following this stepped grate 15.

The arrangement of the two stepped grates 11 and 15 separated from one another enables high bed heights c of the fresh feed 12 in order to improve the heat transfer, since a reliable back-up of the fresh feed 12 is still achieved via the relatively short slope paths. Accretions and sintered chunks rolling down on the slope surface 16 of the bulk material are decelerated on the flat surface 17 of the bulk material in the middle section II of the materials transfer means and are slowly conveyed forward from that point. Both stepped grates 11 and 15 are autonomously protected against thermal and abrasive wear since the bulk material 12 is not moved below the dot-dash parting line or, respectively, shearing section and, in the cooled condition, remains lying on the stepped grates 11 and 15 as a permanent product bed 19. Wear of the grate plates is only to be anticipated in section II of the short sliding grate 13. By comparison to the grate plates of the stepped grates 11 and 15, the grate plates integrated therein are significantly simpler and they can also be more easily replaced. An improvement in the distribution of the fresh bulk material 12 transversely relative to the conveying direction 20 is essentially achieved with the two-fold back-up of material of the two stepped grates 11 and 15 separated from one another by avoiding too rapid a flow-off of the banked bed height having the height c. An additional transverse distribution of material is also promoted by the comparatively short sliding grate 13 of the middle section II of the materials transfer means.

Possible incrustations on the surface 17 of the bulk material are effectively broken up at the sharp transition 21 from the short sliding grate 13 to the inclined stepped grate 15 and the necessary air permeability of the product layer to be cooled is thus restored.

As also proceeds from the drawing, the distance b of the point of intersection 22 between the dot-dash parting line 18 and the system line 23 of the sliding grate 13 of the longitudinal section II from the end 14 of the sliding grate 13 lies in the range $a \geq b \geq 0.5\,a$, whereby the dimension (a) corresponds to the width of a step 24 of the inclined stepped grate 15 of the longitudinal section III.

When the device of the invention is employed as cooler for, for example, calcined ores, then, for example, a low-oxygen cooling gas can also be employed instead of cooling air. Fundamentally, the device of the invention can also be employed in apparatus for drying and/or burning bulk materials.

I claim:

1. A mechanism for cooling bulk materials such as hot cement clinker emerging from a calcining furnace including a materials transfer device for receiving a hot discharge from a furnace, the cooling mechanism comprising in combination:
   a first cooling section having an immobile stepped grate inclined relative to the horizontal having a receiving end for receiving hot material from a transfer device with the materials passing over the stepped grate to a discharge for supporting said bulk material such that it has a slope surface at a first angle relative to the horizontal;
   a second cooling section having a sliding grate and having a receiving end positioned to receive material from the discharge end of the stepped grate and having a discharge end so that the material moves from the receiving end to the discharge end said second cooling section arranged so as to support said bulk material such that it has a surface at a second angle relative to the horizontal less than said first angle;
   a third cooling section having an immobile inclined stepped grate having a receiving end positioned to receive material from the discharge end of the sliding grate with the material moving to a discharge end for supporting said bulk material such that it has a slope surface at a third angle to horizontal greater than said second angle;
   and a fourth cooling section having a sliding grate with a receiving end and a discharge end with the receiving end positioned to receive material from the discharge end of said third cooling section, said fourth cooling section arranged to support said bulk material such that it has a surface at a fourth angle relative to the horizontal less than said third angle.

2. A mechanism for cooling bulk materials such as hot cement clinker emerging from a calcining furnace including a materials transfer device for receiving a hot discharge from a furnace, the cooling mechanism constructed in accordance with claim 1:
   wherein said sliding grate of the second cooling section is comparatively short in length from the receiving to the discharge end in comparison to the length of the first cooling mechanism and includes up to five rows of grate plates;
   and at least one middle row of grate plates but not more than three rows being movably constructed.

3. A mechanism for cooling bulk materials such as hot cement clinker emerging from a calcining furnace including a materials transfer device for receiving a hot discharge from a furnace, the cooling mechanism constructed in accordance with claim 1:
   wherein the sliding grate of the second cooling section is horizontal or slightly inclined in the conveying direction with an angle on the order of 3° or less.

4. A mechanism for cooling bulk materials such as hot cement clinker emerging from a calcining furnace including a materials transfer device for receiving a hot discharge from a furnace, the cooling mechanism constructed in accordance with claim 1:
   wherein the receiving end of the stepped grate of the third cooling section is at a lower elevation than the discharge end of the sliding grate of the second cooling section and includes a shoulder.

5. A mechanism for cooling bulk materials such as hot cement clinker emerging from a calcining furnace including a materials transfer device for receiving a hot discharge from a furnace, the cooling mechanism constructed in accordance with claim 1:
   wherein the sliding grate of the fourth cooling section has a sliding drive unit, and the sliding grate of the second section is connected to said sliding drive unit.

6. A mechanism for cooling bulk materials such as hot cement clinker emerging from a calcining furnace including a materials transfer device for receiving a hot discharge from a furnace, the cooling mechanism constructed in accordance with claim 1:
   wherein a=the width of a first step of the stepped grate of the third cooling section at the receiving end thereof;
   b=the distance between the point of intersection of the parting line of material turning and flowing from the second cooling section to the third cooling section and the distal end of the sliding grate; and wherein $a \geq b \geq 0.5\, a$.

7. A mechanism for cooling bulk materials such as hot cement clinker emerging from a calcining furnace including a materials transfer device for receiving a hot discharge from a furnace, the cooling mechanism constructed in accordance with claim 1:
   wherein the receiving end of the stepped grate of the third cooling section is dropped below the discharge end of the sliding grate of the second cooling section a distance to effectively break up the bulk of material so that the material is broken up and permeability of the layer of the material is restored.

8. A mechanism for cooling bulk materials such as hot cement clinker emerging from a calcining furnace including a materials transfer device for receiving a hot discharge from a furnace, the cooling mechanism constructed in accordance with claim 1:
   wherein the stepped grate of the first cooling section is formed having a steeper slope than the sliding grate of the second cooling section.

9. A mechanism for cooling bulk materials such as hot cement clinker emerging from a calcining furnace including a materials transfer device for receiving a hot discharge from a furnace, the cooling mechanism constructed in accordance with claim 1:
   wherein the slope of the first stepped grate is smaller than the natural slope of fresh bulk material.

10. A mechanism for cooling bulk materials such as hot cement clinker emerging from a calcining furnace including a materials transfer device for receiving a hot discharge from a furnace, the cooling mechanism constructed in accordance with claim 1:
    wherein the angle of inclination of the slope of the first stepped grate is on the order of 20° with a natural slope of fresh bulk material being on the order of 35°.

* * * * *